(12) United States Patent
Jones et al.

(10) Patent No.: US 9,460,326 B2
(45) Date of Patent: Oct. 4, 2016

(54) AUTOMATIC SELF-LEARNING RFID READER CONFIGURATOR

(71) Applicant: Wal-Mart Stores, Inc., Bentonville, AR (US)

(72) Inventors: Nicholaus Adam Jones, Fayetteville, AR (US); Jarrod Lee Bourlon, Centerton, AR (US); Thomas Edward Stiefel, Bentonville, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 575 days.

(21) Appl. No.: 13/862,056

(22) Filed: Apr. 12, 2013

(65) Prior Publication Data

US 2014/0266621 A1 Sep. 18, 2014

Related U.S. Application Data

(60) Provisional application No. 61/789,699, filed on Mar. 15, 2013.

(51) Int. Cl.
*H04Q 5/22* (2006.01)
*G06K 7/10* (2006.01)

(52) U.S. Cl.
CPC .................................. *G06K 7/10227* (2013.01)

(58) Field of Classification Search
None
See application file for complete search history.

(56) References Cited

U.S. PATENT DOCUMENTS

| | | | |
|---|---|---|---|
| 7,602,288 B2 | 10/2009 | Broussard | |
| 2003/0216969 A1 | 11/2003 | Bauer et al. | |
| 2006/0267733 A1* | 11/2006 | Steinke et al. | 340/10.1 |
| 2008/0122581 A1* | 5/2008 | Bae | G06K 7/0008 340/10.2 |
| 2008/0297312 A1* | 12/2008 | Moshfeghi | H04L 47/10 340/10.1 |
| 2010/0019035 A1 | 1/2010 | Larson et al. | |
| 2012/0086553 A1 | 4/2012 | Wilkinson et al. | |
| 2012/0161967 A1* | 6/2012 | Stern | 340/572.1 |

* cited by examiner

*Primary Examiner* — Ojiako Nwugo
(74) *Attorney, Agent, or Firm* — McCarter & English, LLP; David R. Burns

(57) ABSTRACT

According to an embodiment, a computer-implemented method of managing inventory performed by a processor includes receiving in a digital or analog format, from a first computing device, a first request for first radio frequency identification (RFID) tag data associated with a first plurality of RFID tags and receiving in a digital or analog format, from a second computing device, a second request for second RFID tag data associated with a second plurality of RFID tags. In response to the first request and the second request, the method further includes automatically selecting a selected one of a first interrogation mode and a second interrogation mode based on the first request and the second request, and automatically transmitting configuration information to an RFID reader to operate in the selected interrogation mode.

22 Claims, 7 Drawing Sheets

AUTOMATIC SELF-LEARNING RFID READER CONFIGURATOR

CROSS-REFERENCE TO RELATED APPLICATIONS

This application claims priority under 35 U.S.C. §119(e) to U.S. Provisional Patent Application Ser. No. 61/789,699, entitled "AUTOMATIC SELF-LEARNING RFID READER CONFIGURATOR" and filed on Mar. 15, 2013, which is hereby incorporated by reference in its entirety.

BACKGROUND

Embodiments of the disclosure relate generally to data processing, and more particularly to methods and systems for automatically configuring a radio frequency identification (RFID) reader.

Radio-frequency identification has been used for inventory management, i.e., by reading identification information stored on RFID tags attached to various objects, such as retail products. RFID is a wireless, non-contact system that uses radio-frequency electromagnetic fields to transfer data from a tag attached to an object for automatic identification and tracking. A conventional RFID system includes one or more RFID tags and an RFID reader. Each RFID tag includes a transponder having a radio frequency integrated circuit (RFIC) and an antenna for receiving an interrogation signal from the RFID reader and emitting a response signal. The RFIC can store identification information or other data and output such data in the response signal upon receiving the interrogation signal. The RFID reader includes an antenna and a transceiver. The transceiver includes a transmitter, a receiver, and a decoder for processing data in the signal emitted by the RFID tag. The RFID reader can be a mobile, handheld device, or the RFID reader can be mounted in a fixed location, depending on the particular application. When the antenna of the RFID reader is within an effective range for activating the transponder, the transponder is activated by the electromagnetic field from the antenna of the RFID reader. Data can be transmitted by the transponder in the RFID tag to the transceiver of the RFID reader wirelessly. The transceiver of the RFID reader can decode the data received from the transponder. The decoded information can be processed by the RFID reader or transmitted to another computing device for processing.

SUMMARY

Some RFID readers can use different interrogation modes to read RFID tags. The choice of which interrogation mode to use may, for example, be based at least in part on which interrogation mode is most suitable for the task at hand (e.g., reading all RFID tags or reading only previously unread RFID tags). When several different tasks are to be performed, it is advantageous to select an interrogation mode or modes that are most suitable for completing the different tasks in an efficient and effective manner.

According to an embodiment, a computer-implemented method of managing inventory performed by a processor includes receiving in a digital or analog format, from a first computing device, a first request for first radio frequency identification (RFID) tag data associated with a first plurality of RFID tags and receiving in a digital or analog format, from a second computing device, a second request for second RFID tag data associated with a second plurality of RFID tags. In response to the first request and the second request, the method further includes automatically selecting a selected one of a first interrogation mode and a second interrogation mode based on the first request and the second request, and automatically transmitting configuration information to an RFID reader to operate in the selected interrogation mode.

In some embodiments, the second plurality of RFID tags may include a portion of the first plurality of RFID tags, and the second RFID tag data may include a portion of the first RFID tag data. In some embodiments, operating in the selected interrogation mode may cause the RFID reader to read the first RFID tag data and the second RFID tag data using the fewest number of RFID tag read operations. In some embodiments, operating in the selected interrogation mode may cause the RFID reader to read the first RFID tag data and the second RFID tag data in the least amount of time.

In some embodiments, the method may include receiving the first RFID tag data from the first plurality of RFID tags via the RFID reader while the RFID reader is operating in the selected interrogation mode, receiving the second RFID tag data from the second plurality of RFID tags via the RFID reader while the RFID reader is operating in the selected interrogation mode, transmitting the first RFID tag data to the first computing device, and transmitting the second RFID tag data to the second computing device.

In some embodiments, the selected interrogation mode may be automatically selected when the first request and the second request each include a request to receive RFID tag data via the RFID reader from a common subset of the plurality of RFID tags. In some embodiments, the common subset of the plurality of RFID tags may include previously read ones of the plurality of RFID tags. In some embodiments, the method may include automatically configuring the RFID reader to operate in one of an Electronic Product Code (EPC) Gen2 standard-compatible session 0, 1, 2 and 3 and/or automatically configuring a pre-selection criterion filter of the RFID reader based on the selected one of the first interrogation mode and the second interrogation mode.

In some embodiments, the RFID reader may be a first RFID reader, and the method may include automatically transmitting configuration information to a second RFID reader to operate in an interrogation mode different than the selected one of the first interrogation mode and the second interrogation mode. In some embodiments, the method may further include receiving the first RFID tag data from the first plurality of RFID tags via the first RFID reader while the first RFID reader is operating in the selected one of the first interrogation mode and the second interrogation mode, receiving the second RFID tag data from the second plurality of RFID tags via a second RFID reader while the second RFID reader is operating in an interrogation mode different than the selected one of the first interrogation mode and the second interrogation mode, transmitting the first RFID tag data to the first computing device, and/or transmitting the second RFID tag data to the second computing device.

According to an embodiment, an inventory management system includes a programmable processor, and a memory operatively coupled to the processor. The memory has stored thereon computer-executable instructions that when executed by the processor cause the processor to receive in a digital or analog format, from a first computing device, a first request for first radio frequency identification (RFID) tag data associated with a first plurality of RFID tags and receive in a digital or analog format, from a second computing device, a second request for second RFID tag data associated with a second plurality of RFID tags. The memory has further stored thereon computer-executable instructions that when executed by the processor cause the processor to, in response to the first request and the second request, automatically select a selected one of a first interrogation mode and a second interrogation mode based on the first request and the second request, and automatically transmit configuration information to an RFID reader to operate in the selected interrogation mode.

In some embodiments, the second plurality of RFID tags may include a portion of the first plurality of RFID tags, and the second RFID tag data may include a portion of the first RFID tag data. In some embodiments, operating in the selected interrogation mode may cause the RFID reader to read the first RFID tag data and the second RFID tag data using the fewest number of RFID tag read operations. In some embodiments, operating in the selected interrogation mode may cause the RFID reader to read the first RFID tag data and the second RFID tag data in the least amount of time.

In some embodiments, the memory may further include instructions that when executed by the processor cause the processor to receive the first RFID tag data from the first plurality of RFID tags via the RFID reader while the RFID reader is operating in the selected interrogation mode, receive the second RFID tag data from the second plurality of RFID tags via the RFID reader while the RFID reader is operating in the selected interrogation mode, transmit the first RFID tag data to the first computing device, and transmit the second RFID tag data to the second computing device.

In some embodiments, the selected interrogation mode may be automatically selected when the first request and the second request each include a request to receive RFID tag data via the RFID reader from a common subset of the plurality of RFID tags. In some embodiments, the common subset of the plurality of RFID tags may include previously read ones of the plurality of RFID tags. In some embodiments, the memory may further include instructions that when executed by the processor cause the processor to automatically configure the RFID reader to operate in one of an Electronic Product Code (EPC) Gen2 standard-compatible session 0, 1, 2 and 3 and/or automatically configure a pre-selection criterion filter of the RFID reader based on the selected interrogation mode.

According to an embodiment, a non-transitory computer-readable medium has stored thereon computer-executable instructions that when executed by a computer cause the computer to receive in a digital or analog format, from a first computing device, a first request for first radio frequency identification (RFID) tag data associated with a first plurality of RFID tags and receive in a digital or analog format, from a second computing device, a second request for second RFID tag data associated with a second plurality of RFID tags. The non-transitory computer-readable medium has further stored thereon computer-executable instructions that when executed by a computer cause the computer to, in response to the first request and the second request, automatically select a selected one of a first interrogation mode and a second interrogation mode based on the first request and the second request, and automatically transmit configuration information to an RFID reader to operate in the selected interrogation mode.

In some embodiments, the non-transitory computer-readable medium may have stored thereon computer-executable instructions that when executed by a computer cause the computer to receive the first RFID tag data from the first plurality of RFID tags via the RFID reader while the RFID reader is operating in the selected interrogation mode, receive the second RFID tag data from the second plurality of RFID tags via the RFID reader while the RFID reader is operating in the selected interrogation mode, transmit the first RFID tag data to the first computing device, and transmit the second RFID tag data to the second computing device.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

According to various embodiments, computer-implemented methods, computer-readable media and physical inventory management systems are disclosed for automatically configuring radio frequency identification (RFID) readers in response to different requests for various RFID tag data. The RFID reader can be configured in such a way as to read the requested RFID tag data based on the requests.

As will be understood by one of skill in the art, RFID tags, and the data received from the RFID tags, can be used to identify individual items, such as goods, in various environments (e.g., a retail store, warehouse, storage facility, manufacturing facility, freight container, staging area or other space). Being able to identify each item using RFID offers many useful advantages for, among other purposes, inventory management. As used herein, the term inventory management includes, but is not limited to, tracking the presence, location and/or quantity of various items in one or more environments. For example, it may be desirable to track when an item arrives at a store, where the item is located in the store, and when the item leaves the store. Such inventory tracking can be accomplished using data read from the RFID tags associated with the various items.

Figure 1:
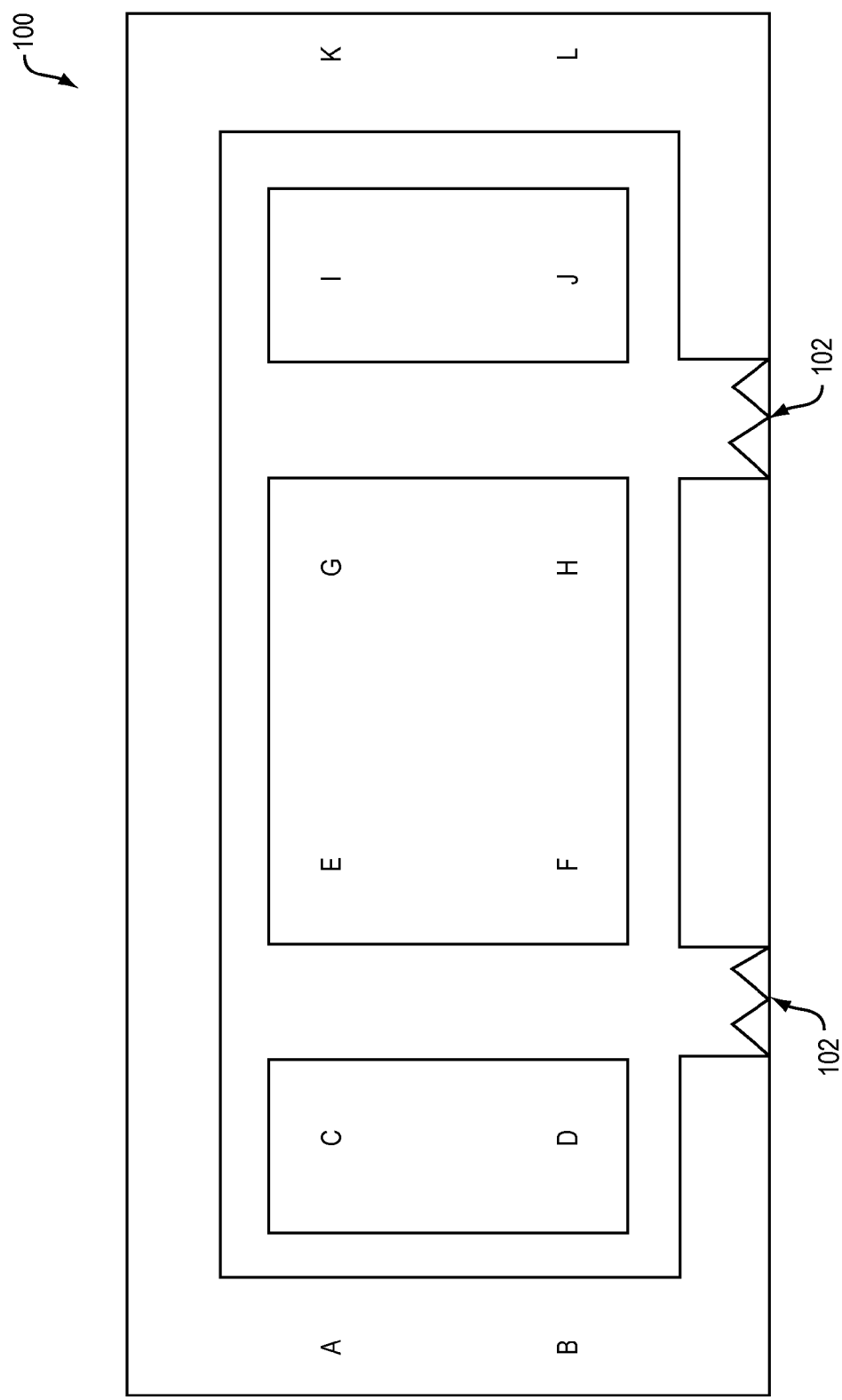
FIG. 1 depicts an example plan view of a retail store for illustrating certain aspects of some embodiments described herein.

In a retail environment, various products or other goods are usually stocked at specific locations within a store. FIG. 1 depicts a plan view of an exemplary retail store 100 having various locations (e.g., departments) indicated at A-L throughout the store. Merchandise items may be stocked at any location A-L in the store 100. It will be understood that the store 100 may include any number of distinct locations for stocking merchandise items. For example, men's clothing may be stocked in one location while women's clothing may be stocked in a different location. Furthermore, often multiple units of the same products are stocked together, for example, twenty pairs of Brand A men's jeans may be arranged in one pile on a display shelf, and another twenty pairs of Brand B men's jeans may be arranged in a separate pile on the same shelf or a different display shelf in the same department.

In one example, multiple items of one product may be preferably stocked in one or more usual locations, such as men's clothing in the men's clothing department A, and women's clothing in the women's clothing department B. Certain products may be stocked in more than one location (e.g., departments A and F), or temporarily moved to a different location, such as a more prominent location near a store entrance 102 during a promotional event. Certain products may be temporarily held in a stockroom or other location prior to or after being moved to a usual location.

Figure 2:
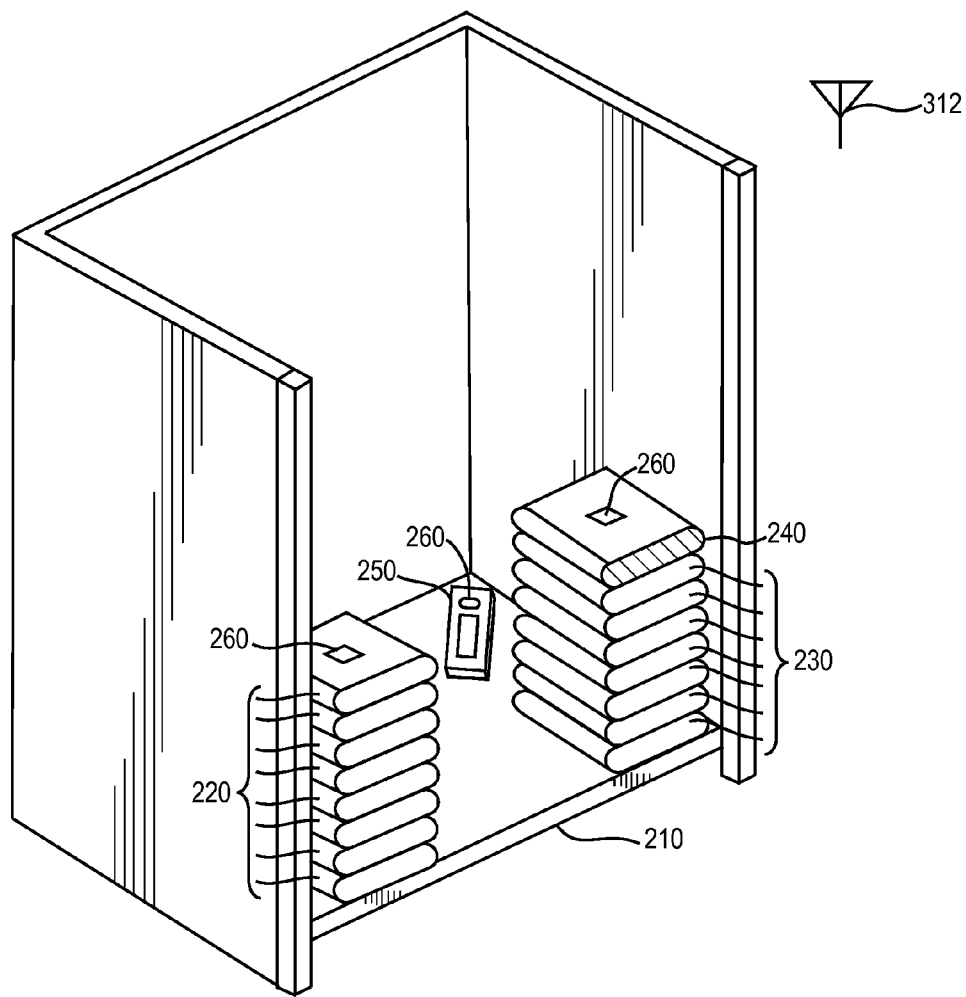
FIG. 2 depicts an example perspective view of a shelf containing various RFID-tagged products for illustrating certain aspects of some embodiments described herein.

FIG. 2 is a perspective view of an exemplary retail store shelf 210 upon which various merchandise items 220, 230, 240 and 250 are placed. The shelf 210 may, for example, be located in any one of the departments A-L in the store 100 of FIG. 1. In this example, the shelf 210 contains eight pairs of Brand A men's jeans 220, five pairs of Brand B men's jeans 230, one pair of Brand C women's jeans 240, and a package of playing cards 250. RFID tags 260 attached to each item contain machine-readable product identification data that, when read, or scanned, by an RFID reader located within the reading range of the RFID tags, can be used to identify individual units of stock. The data may include, but not be limited to, transponder identification, product identification, location information, Universal Product Codes (UPC), and/or Electronic Product Codes (EPC). The EPC is a standardized identifier that provides a permanent and unique digital, machine-readable identity for all products. In some embodiments, each RFID tag 260 includes a transponder that is configured to emit a machine-readable signal containing the product identification data for uniquely identifying the item and/or location of the item to which it is attached. The transponder can be active, passive or battery assisted passive. If the transponder is passive or battery assisted passive, and power can be applied (e.g., to an antenna within range of the RFID tag) to provoke the RFID tag to emit a signal. If the RFID tag is active, such power may not be necessary.

Figure 3:
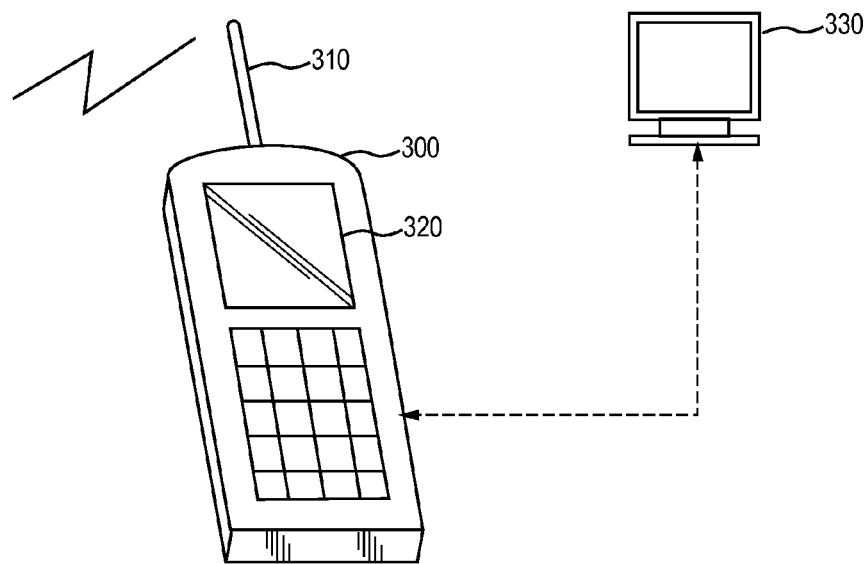
FIG. 3 depicts an example of an RFID reader, antenna and computing device, in accordance with some embodiments.

FIG. 3 depicts an exemplary RFID reader 300. In some embodiments, the RFID reader can be mobile (e.g., handheld), having an antenna 310 for receiving the product identification information stored in the RFID tag and a display 320 for displaying the product identification information or other information, such as an indication of whether an item is misplaced or orphaned, to a user. The RFID reader 300 can, in some embodiments, further identify the location (e.g., Department A-L) in which it is being used. The RFID reader 300 may, for example, include a R1000/R2000 RFID integrated circuit (IC) chip, manufactured by Impinj, Inc. of Seattle, Wash. The RFID reader 300 can be configured to receive and process the signal emitted by the RFID tag 260 while the antenna 310 is within reading range of the signal. In some embodiments, the antenna can be separate from the RFID reader 300, for example, antenna 312, which can be mounted on a wall, shelf or ceiling, and remotely connected to the RFID reader. In some embodiments, the RFID reader 300 is not mobile, but instead in a fixed location.

In operation, the RFID reader 300 communicates with the RFID tags 260 in a conventional manner. For example, with a passive RFID tag 260, the RFID reader 300 interrogates and powers the RFID tag 260 so that the RFID tag 260 communicates information stored in the RFID tag 260 to the RFID reader 300. The RFID reader 300 then processes the information and/or transmits the information to a remote computer 330 for further processing.

Each RFID reader 300 can be associated with a reader antenna, such as antenna 310 (e.g., via a wired connection) or fixed position antenna 312 (e.g., via a wireless connection). In an embodiment, the RFID reader 300 is a handheld, mobile unit that can be carried to different locations A-L in the retail store 100. The associated antenna 310 is placed into proximity of the reading range of the RFID tags 260, and the RFID tags 260 are read. In another embodiment, the RFID reader 300 is mobile, but the associated antenna 310 is located in a fixed position within reading range of the RFID tags 260. In yet another embodiment, the RFID reader 300 is located in a fixed position and connected (e.g., through a communication network) with the fixed position antenna 312. The size and configuration of the antennas 310 and 312 can be designed to provide various reading ranges (e.g., one antenna for coverage of the entire shelf 210 or multiple antennas for coverage of different portions of the shelf 210), as will be understood by one of skill in the art.

The RFID reader 300 can extract and process the product identification data, or other data (e.g., a transponder identification code, a session number, a session flag and/or other settings), contained in the signal. In some embodiments, the product identification data may include, for example, a stock keeping unit (SKU) number, a manufacturer product number, a brand identifier, a model identifier, a product category, a department number, a style, a season, a size, and/or a color associated with the product to which the RFID tag is attached. In some other embodiments, the data received from the RFID tag can be used to identify the product in other ways, such as by cross-referencing the RFID tag data to product data stored in a database. The product data may include one or more characteristics associated with the product, such as brand name, product name or model number, product category (e.g., men's pants, vitamins, paper towels, etc.), SKU number, manufacturer identification number, or other characterizing information. In the example of FIG. 2, items 220 and 230 are both men's jeans, while items 240 is a pair of women's jeans and item 250 is a pack of playing cards.

In some embodiments, the location of the RFID reader 300 can be determined using one or more positioning algorithms, such as those utilizing the Global Positioning System (GPS) or fixed position beacons, or by cross-reference to predetermined locations of the fixed antenna 312 using a Wi-Fi® location-determining system or video analytics.

The rate at which RFID tag data is read by the RFID reader 300 is based at least in part on the interrogation mode of the RFID reader 300 and/or the settings of the RFID tags 260, and may depend on the nature of the task to be performed using the RFID tag data. Examples of such tasks include tracking the ingress and/or egress of items for inventory control, and tracking the location of items in inventory for location control. For instance, when an item arrives at the store, it may be desirable to read the associated RFID tag 260 once as early as possible after arrival so that the presence of the associated item in the store is known. However, once the presence of the item is known, it may not be necessary to re-read the same RFID tag 260 on a repeated basis, for instance, while the item is stocked on the floor of the store, for the purpose of tracking the presence of the item. On the other hand, it may be desirable to read the same RFID tag 260 more than once for the purpose of tracking the location of the item so that the known location of the item is current in the event that the item is moved from one location to another.

Some conventional RFID readers have several limitations that may affect their performance under certain conditions. For instance, the rate at which RFID tags can be read depends on several factors, including the number of tags to be read and the amount of data to be read. Many conventional RFID readers can only read one or a small number of RFID tags simultaneously, thus requiring a sequential polling process for reading multiple RFID tags. As a result, it can take a significant amount of time to read a large number of RFID tags. Some RFID readers can be configured to operate in different interrogation modes for reading RFID tags in different ways. For example, in a first interrogation mode, all RFID tags within reading range of the interrogation signal may be read regardless of whether or not the tag has been previously read by the same or a different RFID reader. One advantage of the first interrogation mode is that every RFID tag will be read, providing current data representing associated items located within the reading range of the RFID reader. However, one disadvantage of the first interrogation mode (e.g., using EPC C1G2 standard protocol) is that the total time to complete the RFID tag reads is relatively long, increasing the risk that while some RFID tags are being read, others may arrive or depart from the reading range of the RFID reader undetected. Furthermore, in a large area, such as the sales floor of a large retail store, many RFID tags may only have power for brief moments of time as they are moved from one location to another. In that case many such RFID tags may miss a read cycle of the RFID reader and consequently not be detected as the associated items move out of an area being inventoried before a new read cycle begins.

By contrast, in a second interrogation mode, only those RFID tags that have not been previously read may be read by the RFID reader. One advantage of the second interrogation mode is that, because it is likely that a smaller population of RFID tags are to be read, it is more likely that any RFID tags that have not yet been read are read relatively promptly and do not pass undetected. However, one disadvantage of the second interrogation mode is that any RFID tags that have been previously read and subsequently moved to a different location may not be detected at the different location.

Therefore, according to some embodiments, it is desirable to automatically configure the RFID reader 300 to operate in the interrogation mode that will read the RFID tag data needed for performing the desired task. One related technique for automatically configuring an RFID reader is disclosed in U.S. patent application Ser. No. 12/900,201 by Wilkinson et al., entitled "Method and Apparatus Pertaining to Use of a Plurality of Different RFID Tag Interrogation Modes" and published as U.S. Patent Application Pub. No. 2012/0086554, which is incorporated herein by reference in its entirety.

In some embodiments, the first interrogation mode and the second interrogation mode can comprise any of the four sessions supported by the Electronic Product Code (EPC) Gen2 standard, as will be understood by one of skill in the art. For instance, the first interrogation mode may be session 2 or 3, and the second interrogation mode may be session 1. Each EPC GEN 2 compliant tag has two states per session: "A" and "B." The "A" state comprises the default state and hence represents the tag's state when initially powering up. Once a tag has been read its state changes from "A" to "B." During the "A" state a tag will respond to any reader that offers a session query. During the "B" state the tag will not again respond to a reader using the same session query. EPC Gen2's four different sessions provide for differences with respect to how a read tag persists a "B" state. In Session "0" a read tag will persist this "B" state until power is lost and then the tag reverts immediately to the "A" state. In Session "1" a read tag will persist its "B" state for a period of time ranging from 500 milliseconds to 5 seconds and will then automatically revert to the "A" state. In Session "2" and "3" a read tag will remain in the "B" state until power is lost. Then, once power is lost, the read tag will persist its "B" state for at least an additional 2 seconds (the actual persistence duration is left to the manufacturer and can reach minutes in some cases). Generally speaking, for many application settings it may be useful for the first interrogation mode to comprise an EPC Gen2 standard-compatible session 2 or session 3 interrogation mode. In this case, "A" state tags are read and then remain quiet and will not respond to further same-session queries unless and until power has been absent for at least 2 seconds and possibly longer (depending upon the characterizing performance of the tags themselves).

It will be understood that any number of different interrogation modes or other operating modes of RFID readers supporting other standards may be utilized in accordance with various embodiments, and the disclosed examples are not intended to be limiting. For example, in some embodiments, the RFID reader can be configured with one or more pre-selection criteria. In such a configuration, the RFID can determine whether the RFID data received from an RFID tag meets the pre-selection criteria, and discard or filter out any RFID data that does not meet the pre-selection criteria. Other data that meets the pre-selection criteria may be processed further (e.g., sent to another device or system, etc.). In another example, in some embodiments, the RFID reader can be configured using certain C1G2 optimization techniques, as will be understood by one of skill in the art.

Figure 4:
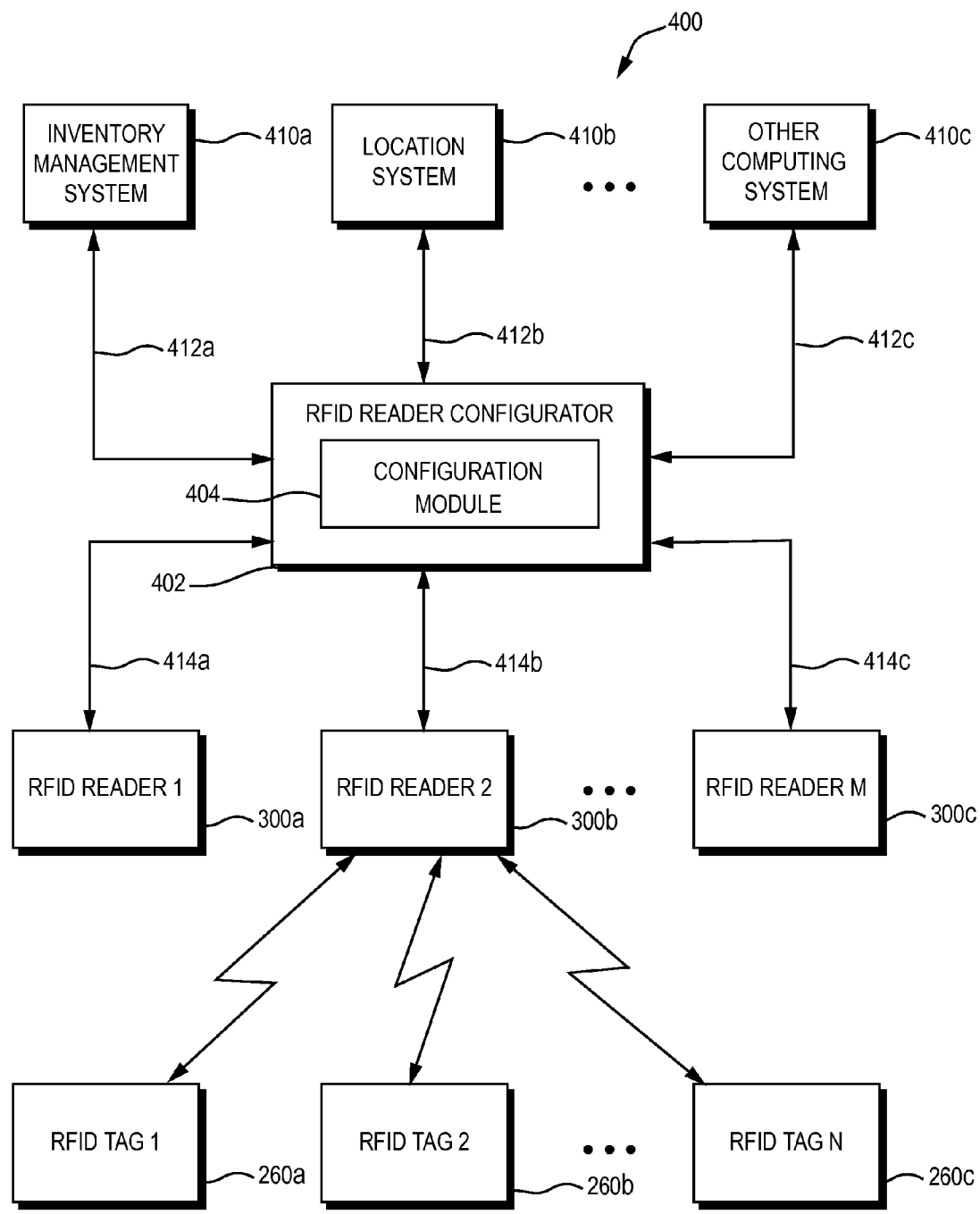
FIG. 4 is an example block diagram of an inventory management environment, in accordance with an embodiment.

FIG. 4 is an example block diagram of an inventory management environment 400, according to an embodiment. The environment 400 may include or be part of, for example, the retail store 100 of FIG. 1, as well as other environments outside of the store 100, such as a data center for housing at least some computing components that are integrated with or operatively coupled to other components within the environment 400. Within the environment 400 is an RFID reader configurator 402, which includes a configuration module 404 for configuring one or more RFID readers 300a, 300b, 300c, (such as the RFID reader 300 of FIG. 3). The configuration module 404 may include hardware, software and/or firmware for performing all or parts of one or more of the exemplary techniques described herein. The RFID readers 300a, 300b, 300c may, for example, be located in various locations throughout the environment 400 (e.g., proximate to any of the locations A-L of the retail store 100).

One or more inventory management and/or location systems 410a, 410b, 410c, or other computing systems can also be included within the environment 400. One or more RFID tags 260a, 260b, 260c (such as the RFID tags 260 of FIG. 2) may also be present within the environment 400, although it will be understood that due to the nature of their use such tags may transit into, out of, and between different locations within the environment 400 over time. Each of the RFID tags 260a, 260b, 260c transmits, via an RF signal, RFID tag data stored in the RFID tag when interrogated by one or more of the RFID readers 300a, 300b, 300c, depending on the interrogation mode in which the respective RFID reader 300a, 300b, 300c is configured to operate in. Correspondingly, one or more of the RFID readers 300a, 300b, 300c receives the RFID tag data from one or more of the RFID tags 260a, 260b, 260c. This process is also referred to herein as reading the RFID tags.

The RFID reader configurator 402 receives one or more requests 412a, 412b, 412c for RFID tag data from one or more of the systems 410a, 410b, 410c in a digital or analog format (e.g., electronically). The configuration module 404 processes each request 412a, 412b, 412c to select a selected interrogation mode for one or more of the RFID readers 300a, 300b, 300c based at least in part on the requests 412a, 412b, 412c. One example of the operation of the configuration module 404 is described below with respect to FIG. 5. The selected interrogation mode is one of the operating modes supported by the RFID readers 300a, 300b, 300c and is at least one of the modes in which the requests 412a, 412b, 412c for RFID tag data can be satisfied, preferably in an efficient manner. In particular, if more than one request 412a, 412b, 412c is to be processed at substantially the same time, there may be one interrogation mode that is better suited to satisfying all of the requests. Examples of satisfying all of the requests include performing the fewest number of tag read operations and/or performing all of the tag read operations in the least amount of time with respect to performing the same operations in an interrogation mode that causes the RFID reader 300a, 300b, 300c to operate differently from the selected interrogation mode.

In some embodiments, some of the requests 412a, 412b, 412c may include requests for different portions of the RFID tag data. For example, one request 412a may include a first request, received from the first system 410a, for RFID tag data from all RFID tags in the environment 400, while a second request 412b, received from the second system 410b, may include a request for RFID tag data from only RFID tags in certain locations of the environment 400, or for RFID tag data from only previously unread RFID tags in the environment 400 (i.e., a portion of the RFID tag data from all of the RFID tags in the environment 400). In this example, therefore, it is possible to automatically configure the appropriate RFID readers 300a, 300b, 300c to operate in a selected interrogation mode via configuration commands 414a, 414b, 414c for receiving RFID tag data from all RFID tags in the environment 400, which will satisfy both the first request 412a and the second request 412b.

Once the RFID readers 300a, 300b, 300c are configured to operate in the selected interrogation mode, the RFID readers 300a, 300b, 300c may operate in a conventional manner to receive RFID tag data as appropriate for the corresponding interrogation mode. The RFID tag data can then be transmitted to the RFID reader configurator 402, or other computing device, for further processing. In the above example, since the second request 412b is for only a portion of the RFID tag data requested in the first request 412a, the RFID reader configurator 402 can transmit only the corresponding portion of RFID tag data to the second system 410b, while transmitting all of the RFID tag data to the first system 410a, in satisfaction of both the first request 412a and the second request 412b using a minimal number of RFID tag reads. After all of the requests 412a, 412b, 412c have been satisfied, the RFID reader configurator 402 can configure one or more of the RFID readers 300a, 300b, 300c to operate in a different interrogation mode (e.g., a default interrogation mode), or wait for additional requests 412a, 412b, 412c before changing the configuration of the RFID readers 300a, 300b, 300c according to the exemplary techniques described herein or other operational rules that may be programmed into the RFID reader configurator 402.

In some embodiments, each RFID reader 300a, 300b, 300c can be configured to operate in a different interrogation mode. For instance, if each RFID reader 300a, 300b, 300c has a reading range or coverage area that overlaps at least partially with at least one other RFID reader 300a, 300b, 300c, then one of the RFID readers 300a, 300b, 300c may be configured to operate in one interrogation mode while at least one other RFID reader 300a, 300b, 300c may be configured to operate in a different interrogation mode, as suitable for satisfying the first request 412a and/or the second request 412b. As an example, if two RFID readers are within reading range of the same set of RFID tags, a first RFID reader may be configured to read, in a first interrogation mode, one subset (or all) of the set of RFID tags for satisfying the first request 412a, while a second RFID reader may be configured to read, in a second interrogation mode, a different subset (or all) of the set of RFID tags for satisfying the second request 412b.

In some embodiments, the interrogation mode of each RFID reader 300a, 300b, 300c can change dynamically based on certain conditions, such as the arrival/activation or departure/deactivation of one or more RFID readers within a particular area. For example, if a first RFID reader 300a is active within a particular area and operating in a first interrogation mode while a second RFID reader 300b becomes active (e.g., is turned on) in the same area, the first RFID reader 300a may be configured to operate in a second interrogation mode in response to the activation of the second RFID reader 300b.

Figures 5A, 5B:
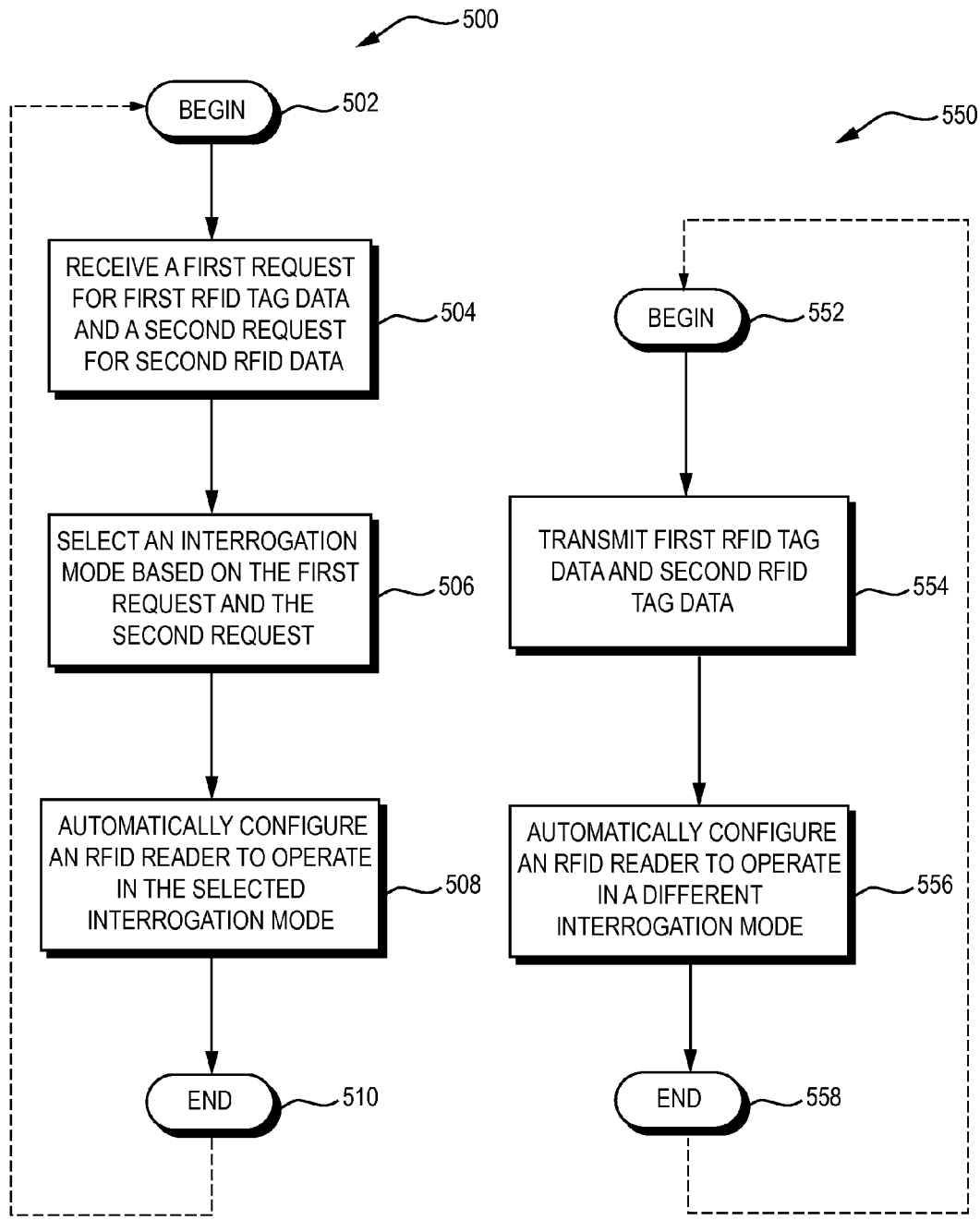
FIG. 5A is an example flow diagram of a process for automatically configuring an RFID reader, in accordance with an embodiment.
FIG. 5B is an example flow diagram of a process for providing RFID tag data, in accordance with an embodiment.

FIG. 5A is an example flow diagram of a process 500 for automatically configuring an RFID reader, such as RFID reader 300 of FIG. 3, according to an embodiment. Process 500 begins at step 502. At step 504, a first request for a first set of RFID tag data and a second request for a second set of RFID tag data is received. The first request and the second request may, for example, be received from the same source (an inventory management system) or different sources (different inventory management systems and/or location systems). The first request and the second request can be the same or different. For example, the first request may include a request to read all RFID tags, while the second request may include a request to read only previously unread RFID tags. The nature of each request may depend on the purpose for which the RFID tag data is to be used. For example, an inventory system may need to know which RFID tags are anywhere in the store, while a location system may need to know where each RFID tag is located on the sales floor or backroom. Thus, both of these system would need to have different sets of the same RFID tag data; in some instances, the second set of RFID tag data can include a subset of the first set of RFID tag data. Put in other terms, the first request and the second request may both include requests for RFID tag data from a common subset of RFID tags, if not all of the RFID tags. These separate needs for RFID tag data by different systems can be represented by the first request and the second request, respectively. It will be understood that, in some embodiments, any number of requests may be received.

At step 506, an interrogation mode of the RFID reader is selected based on the first and second requests. It will be understood that any number of requests can be processed (e.g., three, four, five, six, seven, etc.) For example, as discussed above, if the first request includes a request to read all RFID tags and the second request includes a request to read only previously unread RFID tags, then the selected interrogation mode may be the mode in which all RFID tags will be read (e.g., the first interrogation mode as described above), since the RFID tag data from all RFID tags is necessary to satisfy the first request, unless, for instance, some portion of the RFID tag data has already been read. At step 508, the RFID reader is automatically configured to operate in the selected interrogation mode. In some embodiments, the selected interrogation mode may be one of a set of predefined interrogation modes of a single RFID reader, or the selected interrogation mode may be a combination of different predefined interrogation modes of multiple RFID readers (e.g., one RFID reader may be configured to operate in a first interrogation mode and another RFID reader may be configured to operate in a second interrogation mode.) The determination of the selected interrogation mode can, in some embodiments, be based on the first request and/or second request as well as the location and capabilities of the RFID reader. For instance, if two or more RFID readers have overlapping coverage areas, it may be desirable to configure each of the RFID readers to operate in different interrogation modes in a manner that satisfies the first request and/or the second request.

Process 500 ends at step 510. In some embodiments, process 500 can repeat indefinitely or any number of times.

FIG. 5B is an example flow diagram of a process 550 for providing RFID tag data in response to the first request and the second request, according to an embodiment. In some embodiments, process 550 is performed subsequent to process 500, for example, after the RFID reader has read one or more RFID tags. Process 550 begins at step 552. At step 554, the first RFID tag data is transmitted in response to the first request (e.g., to the system that generated the first request) and the second RFID tag data is transmitted in response to the second request (e.g., to the system that generated the second request). Continuing the above example, if the RFID reader is configured to read all RFID tags (e.g., operate in the first interrogation mode), then the first RFID tag data may include all of the RFID tag data read by the RFID reader at step 554. The second RFID tag data, accordingly, may include only RFID tag data read from previously unread RFID tags, which may include a subset of the first RFID tag data. Thus, the first request and the second request can each be satisfied. Subsequent to step 554, at step 556, the RFID reader can continue to operate in the same (i.e., selected) interrogation mode, or the RFID reader can be configured to operate in a different interrogation mode, as appropriate. For example, at step 556, if there are no further requests to read all RFID tags, but there is an outstanding request to read only previously unread RFID tags, then the RFID reader may be configured to read only previously unread RFID tags (e.g., operate in the second interrogation mode).

Process 550 ends at step 558. In some embodiments, process 550 can repeat indefinitely or any number of times.

While embodiments have been discussed in the context of RFID in an retail environment, it will be appreciated that some embodiments may be used in a similar manner in other environments, such as warehousing, distribution, shipping, storage, or any other environment in which products or other objects having RFID tags may be tracked. For example, some embodiments may be used to identify medical supplies in a hospital, a pallet of freight in a distribution center, cargo on a vessel, and/or animals in a shelter. It will also be appreciated that, in some embodiments, the RFID tags may be attached to, for example, product packaging or shipping containers rather than, or in addition to, being attached directly to individual units of a product.

A variety of commercially available RFID tags, readers and integrated circuits are contemplated for use with various embodiments. For example, RFIC suppliers may include NXP Semiconductors N.V. of Eindhoven, The Netherlands, Impinj of Seattle, Wash., and Alien Technology of Morgan Hill, Calif. In some embodiments, the RFID tags 260 can be embedded or inlayed onto label material attached to each product.

Figure 6:
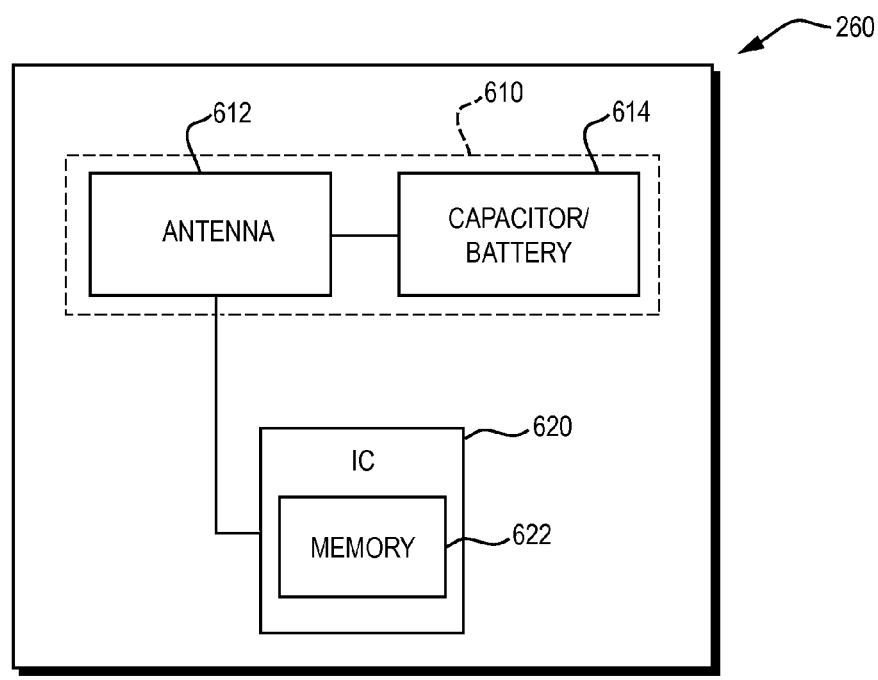
FIG. 6 is an example block diagram of an RFID tag for use with some embodiments.

FIG. 6 is a block diagram of an example of the RFID tag 260 of FIG. 2, which is suitable for use with various embodiments. The RFID tag 260 includes a passive resonant radio frequency (RF) circuit 610 for use in detecting when the tag 260 is within proximity of a reading range of a reader or interrogator, such as RFID reader 300 of FIG. 3. One example of the circuit 610 includes a coil antenna 612 and a capacitor or battery 614, which together form a resonant circuit with a predetermined resonant frequency, i.e., a selected radio frequency. Power for the RFID tag 260 is derived from the antenna 612 in the case where the tag is passive, or from the battery 614 where the tag is active or semi-passive. Furthermore, the RFID tag 260 includes an integrated circuit (IC) 620 for providing processing capabilities to the tag, as will be understood by one of skill in the art. The IC 620 is connected to the circuit 610. The IC 620 may, for example, include a programmable memory 622, such as a 96 bit memory, for storing identification data. It will be appreciated that other RFID tag designs may be used with certain embodiments, and embodiments are not limited to the particular tag design 260 described herein. For instance, the capacitor 614 may be located on the IC 620, with only an inductor coil (i.e., the antenna 612) being outside the IC 620.

The IC 620 can be configured to output a data stream of the data stored in the memory 622 when sufficient power is applied to the RFID tag 260. In one embodiment, the data stream creates a series of data pulses by switching an extra capacitor (not shown) across the coil antenna 612 over a period of time. This changes the resonant frequency of the RF circuit 610, detuning it from the operational frequency. Thus, instead of the RF circuit 610 returning a simple response signal, it returns, for example, a signal containing a packet of preprogrammed information (e.g., the identification data). The packet of data is received and processed by interrogator receiving circuitry and is decoded (if necessary) to provide identification information about the item 220, 230, 240, 250 to which the RFID tag 260 is attached. Other methods of using the data in the IC memory 622 to output identification data from the tag 260 are contemplated and the above embodiment is not intended to be limiting. The IC 620 may be a passive device and is powered in the same manner as the RF circuit 610 (i.e., by using energy received at the antenna 612 from the RFID reader 300 transmitter signal). Other types of RFID tags may be used. In some embodiments, the RFID tags 260 are not reused; that is, they are not removed from the product when the product is sold or otherwise disposed of; however, in some embodiments the RFID tags 260 may be reused.

Figure 7:
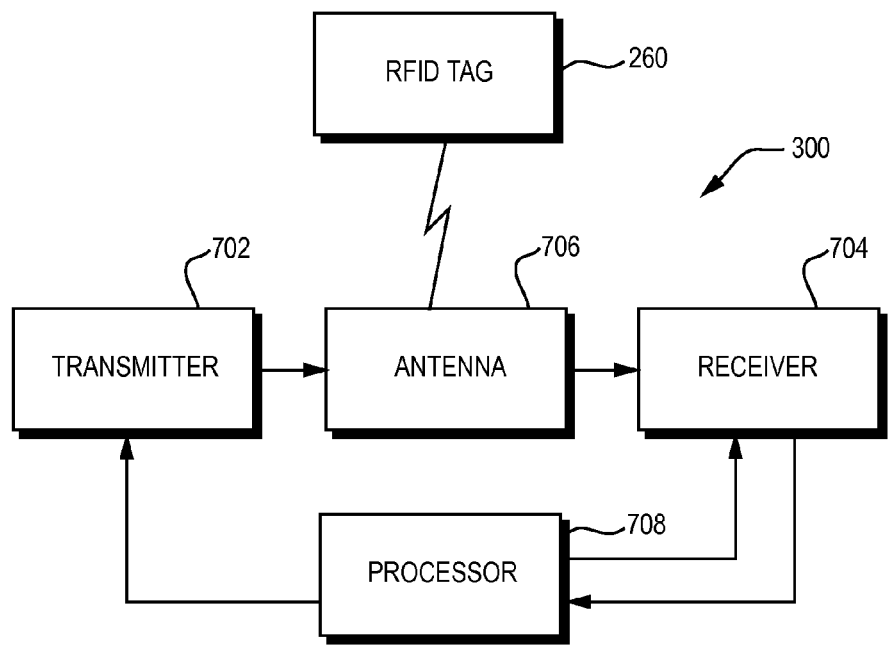
FIG. 7 is an example functional block diagram of an RFID reader for use with some embodiments.

FIG. 7 is a block diagram of an example of the RFID reader 300 of FIG. 3, which is suitable for use with the RFID tag 260 described with respect to FIG. 6. The RFID reader 300 and the RFID tag 260 can communicate by radio. The RFID reader 300 includes a transmitter 702, receiver 704, antenna 706, and data processing and control circuitry 708. An output of the transmitter 702 is connected to an input of the antenna 706. An output of the antenna 706 is connected to an input of the receiver 704. Outputs of the data processing and control circuitry 708 are connected to an input of the transmitter 702 and to an input of the receiver 704, respectively. An output of the receiver 704 is connected to an input of the data processing and control circuitry 708.

Figure 8:
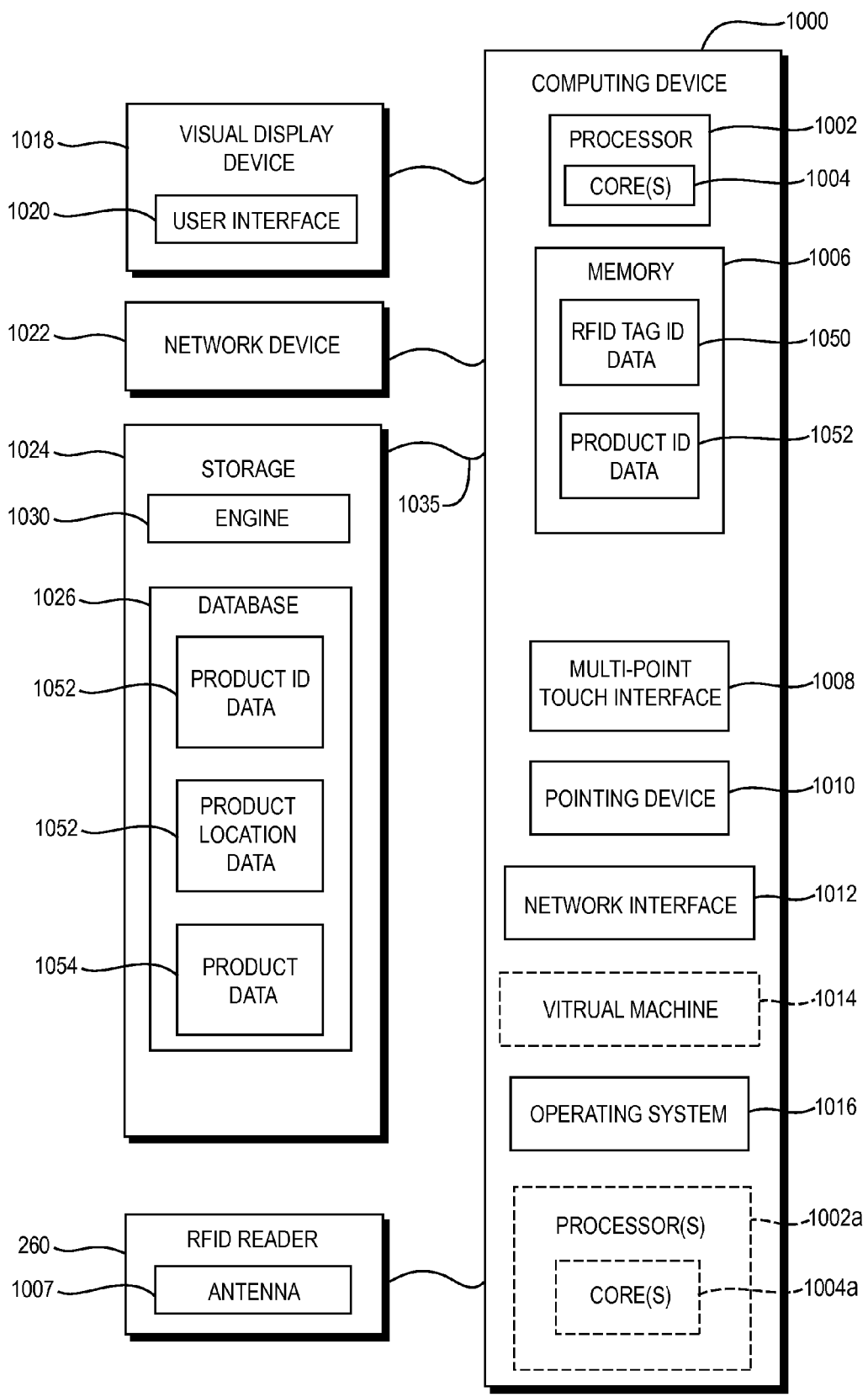
FIG. 8 is an example block diagram of an inventory management system for carrying out one or more embodiments.

FIG. 8 is a block diagram of a system for automatically configuring an RFID reader configured in an exemplary computing device 1000 that may be used to implement exemplary embodiments described herein. In some embodiments, the computing device 1000 is included in an RFID reader configurator (such as the RFID reader configurator 402 of FIG. 4), back office system and/or other computing resource. The computing device 1000 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 1006 included in the computing device 1000 may store non-transitory computer-readable and computer-executable instructions or software for implementing exemplary embodiments, such as process 500 (described above with respect to FIG. 5) of automatically configuring an RFID reader. The computing device 1000 also includes configurable and/or programmable processor 1002 and associated core 1004, and optionally, one or more additional configurable and/or programmable processor(s) 1002a and associated core(s) 1004a (for example, in the case of computer systems having multiple processors/cores), for executing non-transitory computer-readable and computer-executable instructions or software stored in the memory 1006 and other programs for controlling system hardware. Processor 1002 and processor(s) 1002a may each be a single core processor or multiple core (1004 and 1004a) processor.

Virtualization may be employed in the computing device 1000 so that infrastructure and resources in the computing device may be shared dynamically. A virtual machine 1014 may be provided to handle a process running on multiple processors so that the process appears to be using only one computing resource rather than multiple computing resources. Multiple virtual machines may also be used with one processor.

Memory 1006 may include a computer system memory or random access memory, such as DRAM, SRAM, EDO RAM, and the like. Memory 1006 may include other types of memory as well, or combinations thereof. Memory 1006 may be used to store information such as RFID tag identification data 1050, product identification data 1052, product data 1054 (e.g., information about the characteristics of the product), and/or any other information including the first request for RFID tag data and the second request for RFID tag data.

A user may interact with the computing device 1000 through a visual display device 1018, such as a computer monitor or touch screen display integrated into the computing device 1000, which may display one or more user interfaces 1020 (e.g., the display 320 of FIG. 3) that may be provided in accordance with exemplary embodiments. The computing device 1000 may include or be operatively coupled to other I/O devices for receiving input from a user or data from an RFID tag, for example, an antenna 1007, an RFID reader 260, a keyboard or any suitable multi-point touch interface 1008, or a pointing device 1010 (e.g., a mouse). The keyboard 1008 and the pointing device 1010 may be coupled to the visual display device 1018. The computing device 1000 may include other suitable conventional I/O peripherals.

The computing device 1000 may also include one or more storage devices 1024, such as a hard-drive, CD-ROM, or other non-transitory computer-readable media, for storing data and non-transitory computer-readable instructions and/or software that implement exemplary embodiments described herein. The storage devices 1024 may be integrated with the computing device 1000. The computing device 1000 may communicate with the one or more storage devices 1024 via a bus 1035. The bus 1035 may include parallel and/or bit serial connections, and may be wired in either a multi-drop (electrical parallel) or daisy-chain topology, or connected by switched hubs, as in the case of USB. Exemplary storage device 1024 may also store one or more databases 1026 for storing any suitable information required to implement exemplary embodiments. For example, exemplary storage device 1024 can store one or more databases 1026, for storing information, such as product identification information, product characteristics, and/or any other information. The storage device 1024 can also store an engine 1030 including logic and programming for automatically configuring an RFID reader, and for performing one or more of the exemplary methods disclosed herein.

The computing device 1000 can include a network interface 1012 configured to interface via one or more network devices 1022 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 1012 may include a built-in network adapter, network interface card, PCMCIA network card, card bus network adapter, wireless network adapter, USB network adapter, modem or any other device suitable for interfacing the computing device 1000 to any type of network capable of communication and performing the operations described herein. Moreover, the computing device 1000 may be any computer system, such as an RFID reader, workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The computing device 1000 may run any operating system 1016, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 1016 may be run in native mode or emulated mode. In an exemplary embodiment, the operating system 1016 may be run on one or more cloud machine instances.

Figure 9:
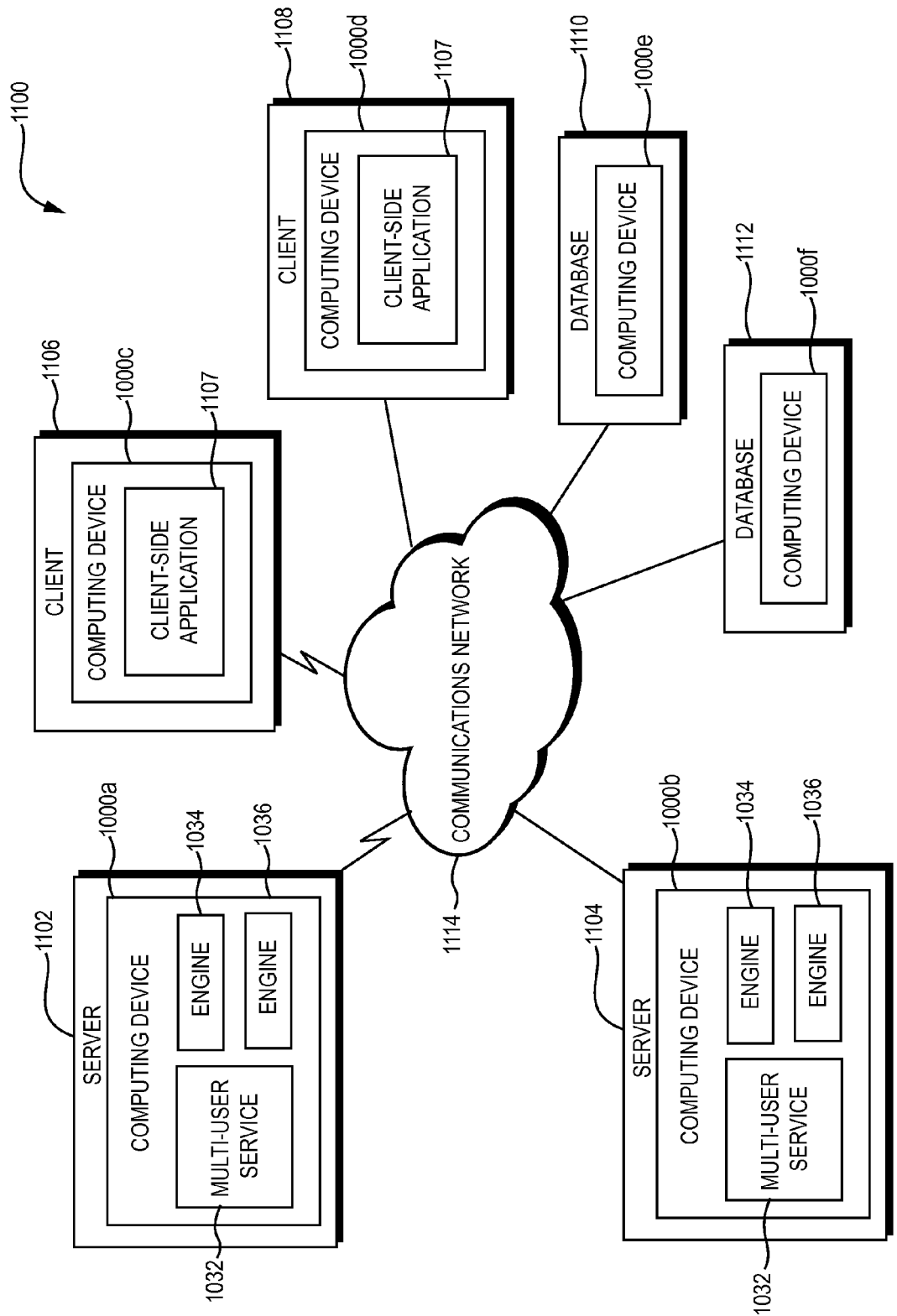
FIG. 9 is an example block diagram a client-server inventory management environment for implementing one or more embodiments.

FIG. 9 is a block diagram of an exemplary network environment 1100 suitable for a distributed implementation of exemplary embodiments of an inventory management system, methods and non-transitory computer-readable media. The network environment 1100 may include one or more servers 1102 and 1104, one or more clients 1106 and 1108, and one or more databases 1110 and 1112, each of which can be communicatively coupled via a communication network 1114. The servers 1102 and 1104 may take the form of or include one or more computing devices 1000a and 1000b, respectively, that are similar to the computing device 1000 illustrated in FIG. 8. The clients 1106 and 1108 may take the form of or include one or more computing devices 1000c and 1000d, respectively, that are similar to the computing device 1000 illustrated in FIG. 8. For example, clients 1106 and 1108 may include mobile user devices. Similarly, the databases 1110 and 1112 may take the form of or include one or more computing devices 1000e and 1000f, respectively, that are similar to the computing device 1000 illustrated in FIG. 8. While databases 1110 and 1112 have been illustrated as devices that are separate from the servers 1102 and 1104, those skilled in the art will recognize that the databases 1110 and/or 1112 may be integrated with the servers 1102 and/or 1104 and/or the clients 1106 and 1108.

The network interface 1012 and the network device 1022 of the computing device 1000 enable the servers 1102 and 1104 to communicate with the clients 1106 and 1108 via the communication network 1114. The communication network 1114 may include, but is not limited to, the Internet, an intranet, a LAN (Local Area Network), a WAN (Wide Area Network), a MAN (Metropolitan Area Network), a wireless network, an optical network, and the like. The communication facilities provided by the communication network 1114 are capable of supporting distributed implementations of exemplary embodiments.

In exemplary embodiments, one or more client-side applications 1107 may be installed on client 1106 and/or 1108 to allow users of client 1106 and/or 1108 to access and interact with a multi-user service 1032 installed on the servers 1102 and/or 1104. For example, the users of client 1106 and/or 1108 may include users associated with an authorized user group and authorized to access and interact with the multi-user service 1032. In some embodiments, the servers 1102 and 1104 may provide client 1106 and/or 1108 with the client-side applications 1107 under a particular condition, such as a license or use agreement. In some embodiments, client 1106 and/or 1108 may obtain the client-side applications 1107 independent of the servers 1102 and 1104. The client-side application 1107 can be computer-readable and/or computer-executable components or products, such as computer-readable and/or computer-executable components or products for presenting a user interface for a multi-user service. One example of a client-side application is a web browser configured to display a web page containing the report data 124 and/or the workload estimate 126, the web page being hosted by the server 1102 and/or the server 1104, which may provide access to the multi-user service. Another example of a client-side application is a mobile application (e.g., a smart phone or tablet application) that can be installed on client 1106 and/or 1108 and can be configured and/or programmed to access a multi-user service implemented by the server 1102 and/or 1104.

The servers 1102 and 1104 can also provide one or more engines 1034, 1036 including logic and programming for receiving the first request for RFID tag data, the second request for RFID tag data, product identification data 1052 and/or other data (e.g., product location data), for performing one or more of the exemplary methods disclosed herein.

The databases 1110 and 1112 can store user information, manifest data, report data and/or any other information suitable for use by the multi-user service 1032. The servers 1102 and 1104 can be programmed to generate queries for the databases 1110 and 1112 and to receive responses to the queries, which may include information stored by the databases 1110 and 1112.

Having thus described several exemplary embodiments of the disclosure, it is to be appreciated various alterations, modifications, and improvements will readily occur to those skilled in the art. For example, it is contemplated that any item, product or good having an RFID tag associated with it can be the object of the disclosed systems and methods. Accordingly, the foregoing description and drawings are by way of example only.

What is claimed is:

1. A computer-implemented method of managing inventory, comprising:
receiving at a radio frequency identification (RFID) reader configurator in a digital or analog format, from a first computing device, a first request for first RFID tag data associated with a first plurality of RFID tags;
receiving at the RFID reader configurator in a digital or analog format, from a second computing device, a second request for second RFID tag data associated with a second plurality of RFID tags;
in response to receiving the first request and the second request, automatically selecting, by a programmable processor of the RFID reader configurator, a selected one of a first interrogation mode and a second interrogation mode for each of a plurality of RFID readers based on the first request and the second request; and
automatically transmitting configuration information from the RFID reader configurator to the each of the plurality of RFID readers to operate in the selected one of the first interrogation mode and the second interrogation mode to concurrently acquire at least a portion of the first RFID tag data associated with the first plurality of RFID tags and at least a portion of the second RFID tag data associated with the second plurality of RFID tags.

2. The computer-implemented method of claim 1, wherein the second plurality of RFID tags includes a portion of the first plurality of RFID tags, and wherein the second RFID tag data includes a portion of the first RFID tag data.

3. The computer-implemented method of claim 1, wherein operating in the selected one of the first interrogation mode and the second interrogation mode causes the RFID reader to read the first RFID tag data and the second RFID tag data using the fewest number of RFID tag read operations.

4. The computer-implemented method of claim 1, wherein operating in the selected one of the first interrogation mode and the second interrogation mode causes the RFID reader to read the first RFID tag data and the second RFID tag data in the least amount of time.

5. The computer-implemented method of claim 1, further comprising:
receiving the first RFID tag data from the first plurality of RFID tags via the RFID reader while the RFID reader is operating in the selected one of the first interrogation mode and the second interrogation mode;

receiving the second RFID tag data from the second plurality of RFID tags via the RFID reader while the RFID reader is operating in the selected one of the first interrogation mode and the second interrogation mode;

transmitting the first RFID tag data to the first computing device; and transmitting the second RFID tag data to the second computing device.

6. The computer-implemented method of claim 1, wherein the selected one of the first interrogation mode and the second interrogation mode is automatically selected when the first request and the second request each include a request to receive RFID tag data via the RFID reader from a common subset of the plurality of RFID tags.

7. The computer-implemented method of claim 6, wherein the common subset of the plurality of RFID tags includes previously read ones of the plurality of RFID tags.

8. The computer-implemented method of claim 1, further comprising automatically configuring the RFID reader to operate in one of an Electronic Product Code (EPC) Gen2 standard-compatible session 0, 1, 2 and 3 and/or automatically configuring a pre-selection criterion filter of the RFID reader based on the selected one of the first interrogation mode and the second interrogation mode.

9. The computer-implemented method of claim 1, wherein the RFID reader is a first RFID reader, the method further comprising automatically transmitting configuration information to a second RFID reader to operate in an interrogation mode different than the selected one of the first interrogation mode and the second interrogation mode.

10. The computer-implemented method of claim 9, further comprising:

receiving the first RFID tag data from the first plurality of RFID tags via the first RFID reader while the first RFID reader is operating in the selected one of the first interrogation mode and the second interrogation mode; and receiving the second RFID tag data from the second plurality of RFID tags via a second RFID reader while the second RFID reader is operating in the interrogation mode different than the selected one of the first interrogation mode and the second interrogation mode.

11. The computer-implemented method of claim 10, further comprising:

transmitting the first RFID tag data to the first computing device; and transmitting the second RFID tag data to the second computing device.

12. An inventory management system comprising:

a radio frequency identification (RFID) reader configurator having a programmable processor; and the RFID reader configurator having a memory operatively coupled to the processor, the memory having stored thereon computer-executable instructions that when executed by the processor cause the processor to:

receive at the RFID reader configurator in a digital or analog format, from a first computing device, a first request for first RFID tag data associated with a first plurality of RFID tags;

receive at the RFID reader configurator in a digital or analog format, from a second computing device, a second request for second RFID tag data associated with a second plurality of RFID tags;

in response to receiving the first request and the second request, automatically select a selected one of a first interrogation mode and a second interrogation mode for each of a plurality of RFID readers based on the first request and the second request; and automatically transmit configuration information from the RFID reader configurator to the each of the plurality of RFID readers to operate in the selected one of the first interrogation mode and the second interrogation mode to concurrently acquire at least a portion of the first RFID tag data associated with the first plurality of RFID tags and at least a portion of the second RFID tag data associated with the second plurality of RFID tags.

13. The system of claim 12, wherein the second plurality of RFID tags includes a portion of the first plurality of RFID tags, and wherein the second RFID tag data includes a portion of the first RFID tag data.

14. The system of claim 12, wherein operating in the selected one of the first interrogation mode and the second interrogation mode causes the RFID reader to read the first RFID tag data and the second RFID tag data using the fewest number of RFID tag read operations.

15. The system of claim 12, wherein operating in the selected one of the first interrogation mode and the second interrogation mode causes the RFID reader to read the first RFID tag data and the second RFID tag data in the least amount of time.

16. The system of claim 12, wherein the memory further comprises instructions that when executed by the processor cause the processor to:

receive the first RFID tag data from the first plurality of RFID tags via the RFID reader while the RFID reader is operating in the selected one of the first interrogation mode and the second interrogation mode;

receive the second RFID tag data from the second plurality of RFID tags via the RFID reader while the RFID reader is operating in the selected one of the first interrogation mode and the second interrogation mode;

transmit the first RFID tag data to the first computing device; and transmit the second RFID tag data to the second computing device.

17. The system of claim 12, wherein the selected one of the first interrogation mode and the second interrogation mode is automatically selected when the first request and the second request each include a request to receive RFID tag data via the RFID reader from a common subset of the plurality of RFID tags.

18. The system of claim 17, wherein the common subset of the plurality of RFID tags includes previously read ones of the plurality of RFID tags.

19. The system of claim 12, wherein the memory further comprises instructions that when executed by the processor cause the processor to automatically configure the RFID reader to operate in one of an Electronic Product Code (EPC) Gen2 standard-compatible session 0, 1, 2 and 3 and/or automatically configure a pre-selection criterion filter of the RFID reader based on the selected one of the first interrogation mode and the second interrogation mode.

20. A non-transitory computer-readable medium having stored thereon computer-executable instructions that when executed by a computer cause the computer to:

receive in a digital or analog format, from a first computing device, a first request for first radio frequency identification (RFID) tag data associated with a first plurality of RFID tags;

receive in a digital or analog format, from a second computing device, a second request for second RFID tag data associated with a second plurality of RFID tags;

in response to receiving the first request and the second request, automatically select a selected one of a first interrogation mode and a second interrogation mode for each of a plurality of RFID readers based on the first request and the second request; and automatically transmit configuration information to the each of the plurality of RFID readers to operate in the selected one of the first interrogation mode and the second interrogation mode to concurrently acquire at least a portion of the first RFID tag data associated with the first plurality of RFID tags and at least a portion of the second RFID tag data associated with the second plurality of RFID tags.

21. The non-transitory computer-readable medium of claim 20, wherein operating in the selected one of the first interrogation mode and the second interrogation mode causes the RFID reader to read the first RFID tag data and the second RFID tag data using the fewest number of RFID tag read operations.

22. The non-transitory computer-readable medium of claim 20, further comprising instructions that when executed by the processor cause the processor to:

receive the first RFID tag data from the first plurality of RFID tags via the RFID reader while the RFID reader is operating in the selected one of the first interrogation mode and the second interrogation mode;

receive the second RFID tag data from the second plurality of RFID tags via the RFID reader while the RFID reader is operating in the selected one of the first interrogation mode and the second interrogation mode;

transmit the first RFID tag data to the first computing device; and transmit the second RFID tag data to the second computing device.

* * * * *